(12) United States Patent
Zheng et al.

(10) Patent No.: US 8,995,473 B2
(45) Date of Patent: Mar. 31, 2015

(54) RING BASED PRECISE TIME DATA NETWORK CLOCK PHASE ADJUSTMENTS

(75) Inventors: Qun Zheng, Surrey (CA); Thomas Geyer, Langley (CA); Tonghua Zhang, Burnaby (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 162 days.

(21) Appl. No.: 13/452,653

(22) Filed: Apr. 20, 2012

(65) Prior Publication Data

US 2013/0279525 A1  Oct. 24, 2013

(51) Int. Cl.
  *H04J 3/06*  (2006.01)

(52) U.S. Cl.
  CPC .................... *H04J 3/0667* (2013.01)
  USPC ........................................ 370/516

(58) Field of Classification Search
  CPC .............................. H04L 12/42; H04L 12/422
  USPC .................................. 370/501–520
  See application file for complete search history.

(56) References Cited

U.S. PATENT DOCUMENTS

| | | | | |
|---|---|---|---|---|
| 7,280,550 | B1 * | 10/2007 | Rosenboom ................... | 370/404 |
| 2006/0245454 | A1 * | 11/2006 | Balasubramanian et al. | 370/509 |
| 2010/0085885 | A1 * | 4/2010 | Sakurada et al. ............. | 370/252 |
| 2010/0085990 | A1 * | 4/2010 | Belhadj et al. ................ | 370/517 |
| 2011/0158120 | A1 * | 6/2011 | Hamasaki et al. ............ | 370/252 |
| 2011/0228888 | A1 * | 9/2011 | Gelter et al. .................. | 375/371 |

OTHER PUBLICATIONS

Laakkonen T. et al. "Analysis of Time-Stamping-Based Synchronization of a PEBB System". Industrial Electronics, 2009. ISIE 2009. IEEE International Symposium on, IEEE, Piscataway, NJ, USA, Jul. 5, 2009, pp. 12-17, XP031518775, ISBN: 978-4244-4347-5.

Laakkonen T. et al. "Time-Stamping-Based Synchronization of Power Electronics Building Block Systems", IECON 2009—35th Annual Conference of IEEE Industrial Electronics (IECON 2009), Nov. 3-5, 2009, pp. 925-930, XP031629692, ISBN: 978-1-4244-4648-3.

IEEE Standard for a Precision Clock Synchronization Protocol for Networked Measurement and Control Systems, IEEE Std 1588-2008 (Revision of IEEE Std 1588-2002), Publication Year: 2008, pp. 1-269.

ITU-T G.8265.1 Y.1365.1-2010 "Precision Time Protocol Telecom Profile for Frequency Synchronization", Publication date: Oct. 1, 2010, International Telecommunication Union (ITU), pp. 1-28.

\* cited by examiner

*Primary Examiner* — Chi H Pham
*Assistant Examiner* — Fahmida Chowdhury (57) ABSTRACT

Clock phase errors are detected and adjusted in a network with loop back connections for clock signals. In one embodiment, a method is performed in a ring network with slave clock nodes. A timing packet is sent from the master clock node to a first slave clock node of the ring. A timing packet is received from a last slave clock node of the ring. A phase alignment offset is determined by comparing a recovered time from the received timing packet with the time of the master clock node local clock and a phase correction value is determined for the slave clock nodes based on the determined phase alignment offset. A phase correction packet including the phase correction value is then sent from the master clock node to at least one of the slave clock nodes.

20 Claims, 7 Drawing Sheets

RING BASED PRECISE TIME DATA NETWORK CLOCK PHASE ADJUSTMENTS

FIELD

Embodiments of the invention relate to the field of clock phase adjustment in packet data networks; and more specifically, to the clock phase adjustment using a looped back clock in a ring network.

BACKGROUND

Precision synchronization may be used in a packet network to distribute timing from a producer to a consumer. The producer and consumer may or may not communicate through the packet network. There are many different efforts to better synchronize the local clocks of nodes on different networks. Better timing and better synchronization provide many different benefits.

One approach to synchronizing the clocks or nodes of a packet data network is referred to as PTP (Precise Time Protocol), and is defined in IEEE-1588 2008, IEEE (Institute of Electrical and Electronics Engineers) Standard for a Precision Clock Synchronization Protocol for Networked Measurement and Control Systems. The PTP approach is intended to provide precise clock timing synchronization over a packet network. In brief, PTP distributes a grandmaster clock's time of day to a large number of slave clocks using special PTP messages. The PTP packets include timestamps. A slave clock receives the included timestamp and then adjusts its local clock to track and recover the timing of the master clock from which it received the timestamp. This delay may include the time required for the PTP packet to travel from the master clock to the slave clock.

The slave clock may serve as a master to another clock. This chain from master to slave through a sequence of clocks allows PTP to align each slave clock to the grandmaster clock to within less than a microsecond.

SUMMARY

PTP (Precise Time Protocol) BC (Boundary Clock) chain performance can be improved for phase alignment by dynamically adjusting each BC's phase during runtime. The adjustment can be based on measurements of feedback timing information. Such a measurement can be easily provided when the BC chain is arranged in a ring network topology. The dynamic adjustments allow the number of hops to be at least tripled without losing the desired accuracy in clock synchronization. This can be done without requiring any additional hardware in each BC. The dynamic adjustment statistically improves PTP clock phase distribution performance dynamically. It also provides dynamic phase error detection in runtime.

The same measurements can also be used to dynamically detect most exceptional cases in which a BC in a particular network chain has a phase offset drift that is more than a desired threshold. This offset detection can be used to alarm system administrators for early awareness and correction.

In one embodiment, a method is performed in a ring network with slave clock nodes. A timing packet is sent from the master clock node to a first slave clock node of the ring. A timing packet is received from a last slave clock node of the ring. A phase alignment offset is determined by comparing a recovered time from the received timing packet with the time of the master clock node local clock and a phase correction value is determined for the slave clock nodes based on the determined phase alignment offset. A phase correction packet including the phase correction value is then sent from the master clock node to at least one of the slave clock nodes.

In another embodiment, a method is performed in a slave node in a ring network of slave clock nodes and a master clock node. The slave node receives a timing packet including a time stamp from the master port of a prior network node in the ring. The slave node sends a timing packet that reflects its local clock to the next network node in the ring. The slave node then receives a phase correction packet including a phase correction value that was generated by the master clock node, the phase correction value being based on a phase alignment offset determined using the sent timing packet. The slave clock node then corrects its local clock based on the phase correction value received in the phase correction packet.

In another embodiment, a master clock node in a network of nodes having a master clock node with a local clock and a plurality of slave clock nodes each with a local clock, the slave clock nodes being in a ring topology from the master clock node and back to the master clock node, compensates for phase alignment offset among the slave clock nodes. The master clock node includes a local clock to maintain timing for the network, a master port to send a timing packet including a time stamp to a slave port of a first one of the slave clock nodes in the ring, and a slave port to receive a timing packet from a last one of the slave clock nodes in the ring. The master clock node also includes a processor to determine a phase alignment offset of the slave nodes using the received timing packet and the sent timing packet, and to determine a phase correction value for the slave clock nodes based on the determined phase alignment offset. The master clock node also sends a phase correction packet including the phase correction value from the master clock node to at least one of the plurality of slave clock nodes.

In another embodiment, a slave clock node in a network of nodes having a master clock node with a local clock and a plurality of slave clock nodes each with a local clock, the slave clock nodes being in a ring topology from the master clock node and back to the master clock node, compensates for phase alignment offset among the slave clock nodes. The slave clock node includes a local clock to maintain timing for the slave clock node, a slave port to receive a timing packet including a time stamp from the master port of a prior network node in the ring, a master port to send a timing packet to a slave port of a next network node in the ring, and a processor. The slave clock node receives a phase correction packet including a phase correction value from the master clock node, the phase correction value being based on a phase alignment offset determined at least in part based on the sent timing packet, and the processor corrects the local clock based on the phase correction value received in the phase correction packet.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

Time distribution through PTP clocks suffers from too much Phase Alignment Offset (PAO). This is particularly true when PTP is used with a chain of PTP BC (Boundary Clock) clocks. The PAO can be caused by delay asymmetry, including link asymmetry and local asymmetry, intra-clock time distribution, and PTP servo performance.

Asymmetry can arise from the link between two clocks, and from within a PTP port before the time stamping point in the transmit and receive direction. Link asymmetry relates to the transmit and receive signal delivery time difference in the packet data network connection links. Local asymmetry comes from the internal operation of a local hardware device, such as a slave clock node. Intra-clock time distribution relates to the difference between the time base between two BC clocks. PTP servo performance relates to errors introduced due to either packet arrival jitter and wander, or local reference TCXO/OCXO (Temperature Compensated Crystal Oscillator/Oven Controlled Crystal Oscillator) stability or accuracy. In addition, due to the network noise introduced to the PTP clock synchronization logic, the PTP servo will have some errors that will depend on the network traffic.

It can be difficult to compensate for these problems that cause PAO because of two important characteristics of PAO. First, PAO can only be measured using special equipment at each clock in a chain. There is no way in the PTP standard to dynamically detect a PTP clock or part of a BC chain that has PAO over a certain threshold. Second PAO can change quickly due to circumstances outside of the PTP packet system including environmental factors, such as ambient temperature. PAO can change with a change in a connection, such as fiber, optical module SFP/XFP (Small Form Factor Pluggable/10G SFP), and optical switches in the middle of a connection for redundancy purposes. PAO can also change due to a change in a PTP port hardware device, a PTP clock, a PTP master stream to which a current BC is synchronized. In any chain of BC, there is also a "jet-lag" on the time synchronization that leads to fluctuations in the PAO with time.

The current PTP standards assume that intra-clock time distribution errors are well-controlled; and that PTP servo performance is good enough with the help of network engineering to reduce the packet jitter or wander and delay variation. This assumption limits the value of PTP for higher speed networks.

For mobile backhaul and some other environments to which a ring based network is applicable, a ring based PTP BC chain can be used to improve the Phase Alignment Offset (PAO). The principles may be applied to reduce other phase errors and so the timing problem will be referred to herein as a phase error, or just as an error.

Figure 1:
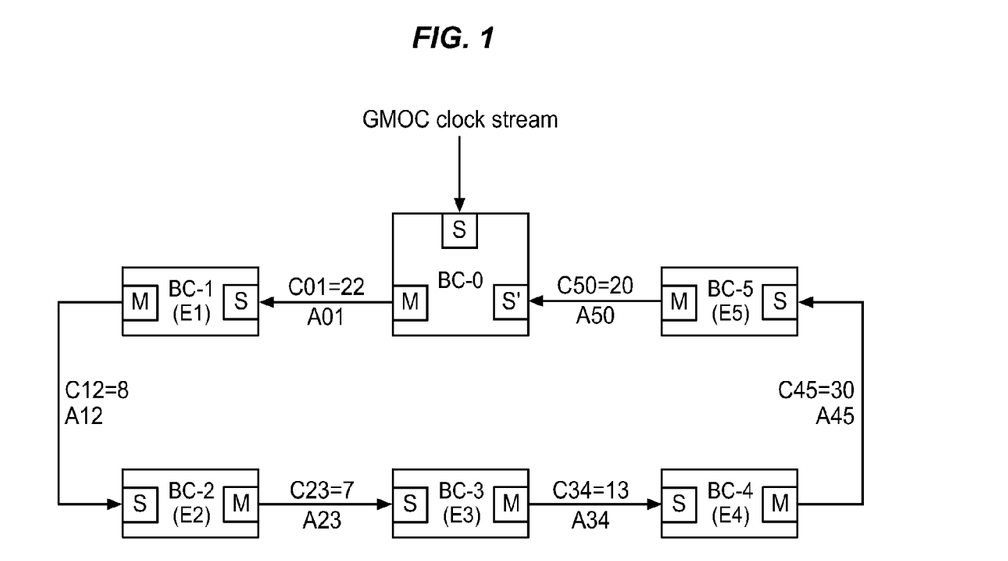
FIG. 1 is a block diagram of a synchronized ring network of clock nodes, such as PTP BCs, according to one embodiment of the invention.

In FIG. 1, six BCs (Boundary Clocks) BC-0 to BC-5 are arranged in a ring network topology. Each BC is a part of a network node, such as a switch, a client, a server, or a router. The BC is used to determine timing for send and receive operations by the node. A first one of the BCs, BC-0 has a slave clock port from which it receives a GMOC (Grand Master Ordinary Clock) or any other master clock stream, depending on the particular implementation. This clock stream is sent out through a corresponding clock master port, M, to the slave port, S, of the next BC in the ring BC-1. The clock signal continues to propagate from master port to slave port through all six clocks of the ring until it returns to the original starting location at the first BC, BC-0. This BC includes a second slave port, S', to receive the returned clock signal after it has propagated through the ring.

A BC is both a slave node to its master on the network and a master node to any downstream synchronizing slave nodes. Each BC usually has a slave port used to synchronize to its master on the network, and has a set of master ports to distribute timing information to its slave nodes in the network. In PTP, a BC has both a master and a slave port, with the master port connected to a downstream slave port on the PTP nodes (BC or SOOC) on the network to distribute time to these nodes, and with the slave port connected to a master port of a master clock (BC or GMOC) on the network to synchronize its time.

Typically for PTP a large number timing packets are sent and received between any two adjacent BCs in the ring. The PTP packets may be sent at a rate of ten to several hundred packets per second to each slave port and this rate may be maintained consistently at all hours of operation. In use even at this PTP packet rate is may be 15 minutes to several hours to synchronize the local clocks of each BC and a continuing stream of PTP packets maintains the synchronization. Each packet is terminated immediately at the node that receives it. The receiving node regenerates the timing information in a new packet that is sent downstream through the ring. The exchanged timing packets on the slave port of a clock are then used to restore the local clock's time of day. The master ports on the clock will use this local clock to re-generate the timing packets and send those to downstream BC's.

For BC-0 this second slave port is not used as a "normal" slave port. BC-0 does not use the time offsets from S' to adjust its local clock output. Instead BC-0 compares the local time recovered from the source clock, in this case the GMOC clock stream, through port S to the recovered time from BC-5 received through port S'. In this way, BC-0 can see the accumulated phase time offsets through the ring.

While the nodes are referred to as PTP BC, a term defined in IEEE 1588, the invention is not limited to this term or this protocol. As used herein a BC is used as an example of a slave clock node in any type of network. A slave clock node is not intended to be limited to a slave node as defined in PTP. Similarly, a root BC or OBC is used as an example of a master clock node and is not intended to be limited to a master node or master clock as defined in PTP.

Each BC introduces some error E1 to E5 from its own hardware and connection configuration. In the present description, these errors are also called node PAO (NPAO). Sum PAO (SPAO) is used to describe the sum of all NPAO introduced before and including the concerned BC in a chain. As an example, NPAO at node 3 is the error introduced by node 3 or E3. SPAO at node 3 is the sum of the PAO at nodes 1, 2, and 3, or SPAO-2+E3, or SPAO-1+E2+E3, or E1+E2+E3. The SPAO value may be used in considering PTP BC chain health status. In one embodiment health can be determined by applying a threshold to the SPAO. Any BC in a BC chain that has an error above a predefined threshold may be declared "bad".

In most cases, the NPAO introduced in each clock in a BC chain does not follow any particular pattern. The NPAO at each clock may be thought of as a random amount with the bounds of the clock design. In other words, each BC will typically introduce a different error and the errors will have no correlation to each other. In some cases, the errors may eventually add up to zero, but in most cases, there will be some non-zero SPAO after the clock traverses the ring. By configuring the BCs into a ring of PTP clocks, the starting master clock provider can detect the final |SPAO introduced in all of the clocks, and readjust each clock based on either a weighted offset or a plain average offset to make the end-to-end SPAO approach zero. This improves the SPAO through the ring as a whole. By adjusting the SPAO to zero at the master, the NPAO at each hop becomes smaller in most cases. Since slave clocks will ultimately be attached to different BCs in the ring, this means that each slave clock's PAO will also be decreased.

Two different measurements of PAO as viewed from the perspective of PTP may be used absolute (APAO) and relative (RPAO). In PTP, APAO is the maximum absolute value of all SPAO in a BC chain, while RPAO is the maximum offset between any two SPAOs of BC clocks in a BC chain. By readjusting the BCs based on the end-to-end PAO, or APAO, the APAO is reduced as well as the RPAO.

An alarm mechanism may also be used. The alarm may be triggered by dynamic PAO measurements. An alarm may be generated, for example, if the system APAO is over a predefined threshold. Such an alarm is generated using measurements that are already being made in order to readjust the clocks. This facilitates early notification of a bad PTP clock to the network administrator resulting in better responsiveness and a reduction in the time/effort consumed on offline measurement and testing.

Returning to FIG. 1, all the involved BCs are arranged in a ring, instead of a linear chain. BC-5 at the end of the chain connects back to the original clock source BC-0 to make the chain a ring. While five BCs are shown, far more or fewer BCs may be used depending on the particular implementation. The same approach may also be applied to a tree network topology structure, as long as the end clock is connected back to the original source clock. If the ring between the source clock and end clock is established, then a PAO for the ring can be measured and the BCs can be readjusted.

The BC ring distributes the PTP clock phase through each link around the ring. Specifically, the PTP clock phase travels from BC-0 to BC-1 to BC-2 to BC-3 to BC-4 to BC-5 and back to BC-0. The links are labeled with the first number indicating the master port at the origin and the second number being the slave port at the destination. Accordingly, the links start at link C01 (with line asymmetry A01 that is unknown unless measured offline, and an e.g. 22 us round trip latency). The clock phase then travels through C12, C23, C34, C45 and eventually back to BC-0 through C50. As a special node, BC-0 may also be referred to as original BC (OBC), because it is the ultimate time source for the ring or chain of nodes and because it has the information to facilitate a correction algorithm. BC-5 in this case may be referred to as the last BC in the chain.

Each BC may also have other master ports to distribute its frequency and phase to downstream PTP clocks (not shown). These are not shown in order not to obscure the invention. The network topology may be far more complex than the simple examples described herein.

PTP clock redundancy is considered separately. The single BC-0 serves as the clock source for the BC ring, and it synchronizes its clock from a connected GMOC through its slave port S. The second slave port S' on BC-0 is used to recover the clock information from BC-5, and BC-0 can use the recovered result to compare with its local PTP clock phase. This comparison allows it to measure the accumulated PAOs in the ring. The accumulated PAOs are the SPAO and may be referred to as Esum and defined as in Eq. 1

$$E\text{sum} = E1 + E2 + E3 + E4 + E5 + E0 \qquad \text{Eq. 1}$$

In Eq. 1, E refers to the timing and phase errors of all types introduced by the respective BC from the input of its slave port (including the link asymmetry introduced error) to its output or master port. In the case of E0, this represents the error introduced by the second slave return port S' itself. For each of the errors E0 to E5, En may be used for brevity herein.

The errors En are introduced by asymmetry in the up-link connection (for E1, it is A01), internal asymmetry within the BC and PTP servo performance on the prior BC, BC-n. The described techniques allow these errors to be compensated without precise knowledge of the source or location of the errors. This is because the sum of all of the errors, Esum, can be monitored in BC-0.

Since the error, En, for any one BC may be positive or negative, the total error, Esum, through the ring may be either positive or negative. The total may also turn out to be zero. Esum may end up being zero even if there are some non-zero errors within the ring. In this case, the clocks are not readjusted notwithstanding these non-zero errors within the ring.

If Esum is not zero, such as 100 ns, then the total error can be re-distributed across all of the BC-n. There are several different ways to make the distribution. In one embodiment, the total error Esum or SPAO is evenly distributed. Esum is divided by the number of BCs in the ring and the result is sent to each BC as a timing or phase adjustment for each BC to use between its slave port and its master port. In the example of a total error of 100 ns, 100/6=16.6 ns which is the correction to each BC-n.

In a second embodiment, a weighted distribution may be used. Any of a variety of different weighting techniques may be used. The weighting, for example, may be based on inter-clock distance, propagation delay, or the round-trip-delay of the connections. In FIG. 1, the Cxy values denote the connection and its delay value. As an example, for the connection between BC-0 and BC-1, C01, the delay is 22 µs. This represents the time required for the clock signal to travel connection C01 the distance between the two BC. BC-1 and BC-2 are closer together, so the signal requires only 8 µs to travel between the two BCs on connection C12. For the example of FIG. 1, the propagation delay is provided for each connection and the total delay is 22+8+7+13+30+20=100 µs. So the compensation weighting for BC-1 is −(100%×22 µs/100 µs)=−22% of the total readjustment. For BC-2, it is 8% of the adjustment.

The determination of the total error may also be used to monitor the health of the system. If the SPAO is too high, then this is an indication that one of the BCs is not functioning properly or that there is a problem with a connection or path. Typically, a threshold may be specified for the maximum PAO that the BC ring can tolerate. This may be for example, on the order of 500 to 1000 ns depending on different communications standards and the particular implementation and network topology.

Using 500 ns as the threshold, for example, if the detected Esum is either above 500 ns, or below −500 ns, then an administrator alarm may be generated and sent to an administration console (not shown). The alarm will indicate that very likely at least one BC in the ring is off by too much. This could be any one of the BCs including the one that generates the master clock and compares it to the returned clock BC-0. Notwithstanding the alarm, the master, BC-0, may continue to provide readjustments to distribute corrections to all of the BCs. However, in PTP there is no indication of the result of this correction. It is up to the application that using the PTP clock to detect such failures dynamically.

If the detected Esum is within 500 ns of zero, then there are two possibilities: First, all of the BCs are within the threshold, or second, some of the BCs are malfunctioning but the errors cancel each other. If a higher level application in PTP that is using a clock claims that the clock is not accurate enough, and needs some readjustment, then this readjustment may be used and applied to the indicated clock. This correction will then affect the Esum value and change the readjustment that is sent out to all of the BCs. This may provide a better result or it may not be able to correct for the clock that is in error.

Figure 2:
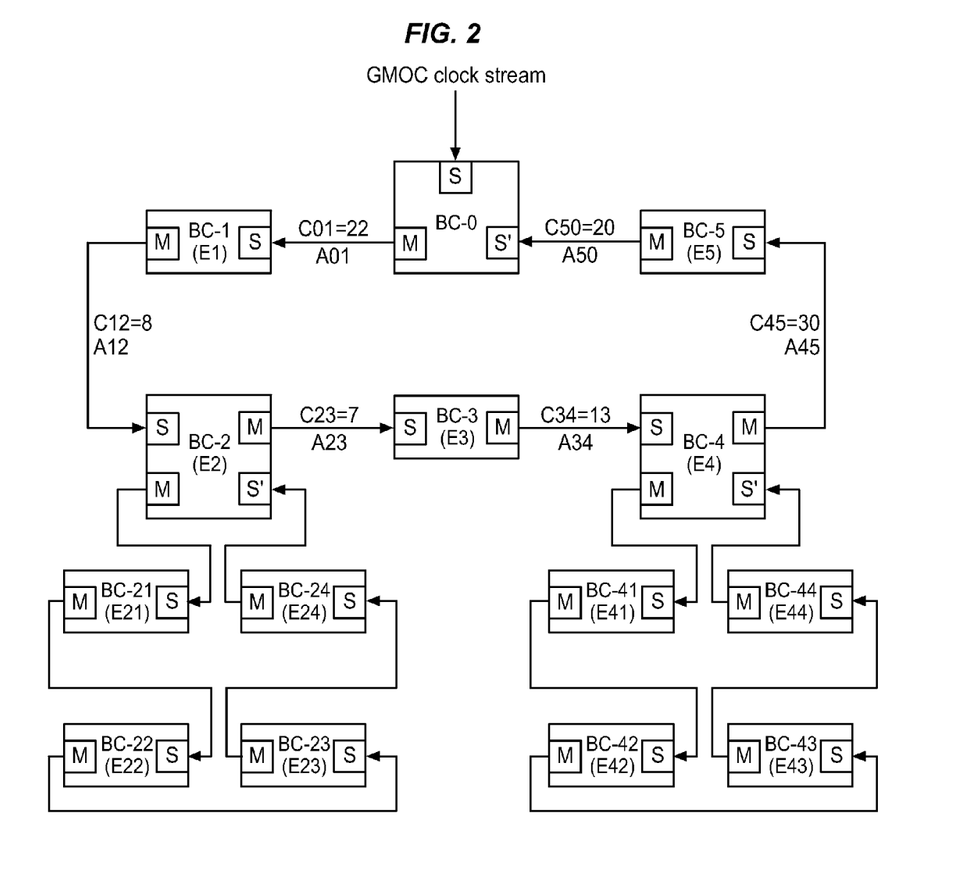
FIG. 2 is a block diagram of a synchronized ring network with daisy-chained sub rings of clock nodes, such as PTP BCs, according to one embodiment of the invention.

FIG. 2 is a diagram of another network topology in which some rings are daisy-chained. The less the number of BCs in a ring, the better will be the result of the phase alignment. Daisy chaining some of the rings together reduces the phase alignment errors for the total ring. FIG. 2 shows the same six BC ring as in FIG. 1, however, two additional rings have been added. The first sub-ring daisy chains from BC-2 and this ring has four BCs, BC-21, BC-22, BC-23, and BC-24. Each of these BCs in the ring is coupled through master port, slave port connection as in the primary ring.

Similarly, the second added ring daisy chains from BC-4 and adds BC-41, BC-42, BC-43, and BC-44 which are coupled from master port to slave port and back around to a second slave port S' on BC-4. In this way BC-2 and BC-4 each behave as OBC for their respective downstream sub-rings. BC-2 and BC-4 are shown as each having two master ports, one for the primary ring and one for the sub-ring, however, the same master port may be used for both, depending on the network protocols.

In the example of FIG. 2, each OBC, that is BC-0, BC-2 and BC-4 compares the local time recovered from the primary clock received through their respective slave ports, S, to the time looped back from the last node in the ring to their respective secondary slave port S'. The difference provides a local Esum for use in readjusting the clock of each node as described above. Additional variations and combinations of the connections and processes described above may be made to suit different implementations and network topologies.

Figure 3:
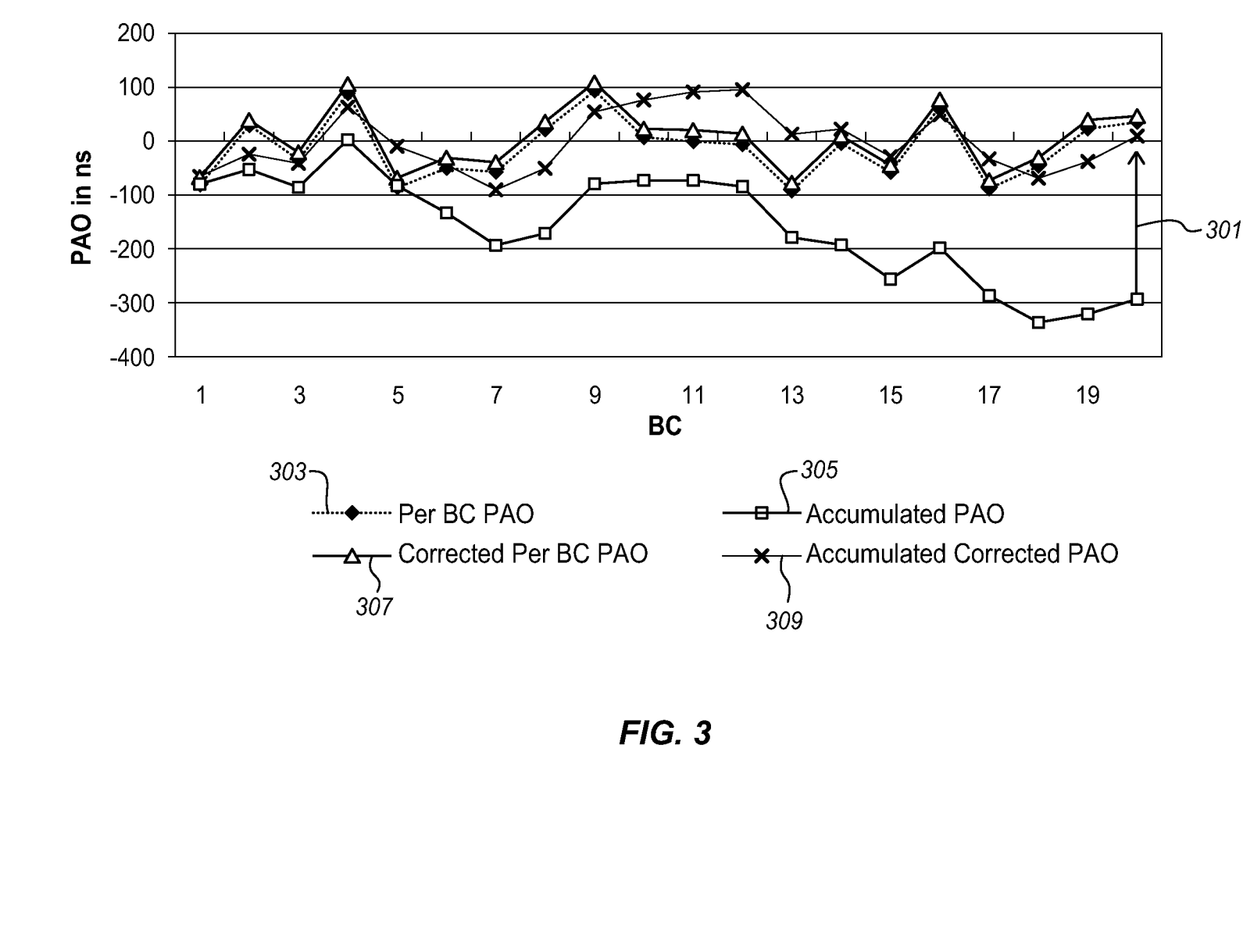
FIG. 3 is a graphical diagram of the propagation and correction of errors through a 20 node synchronized ring network according to one embodiment of the invention.

FIG. 3 is a diagram of errors as the clock traverses a ring to illustrate principles of embodiments of the present invention. The corrections may be thought of as a technique to "tilt" a drifting trend line back toward the expected target of zero error by monitoring the amount of the final phase offset, the error from beginning to end, and then adjusting the phase by distributing the phase error to all the BCs in the chain. This tilt back is indicated by the arrow 301 shown at the right end of horizontal axis which represents the end of the network ring in FIG. 3.

The vertical axis represents an example of phase errors or phase alignment offsets indicated in nanoseconds. The horizontal line indicates each of 20 BCs in a ring through which the clock signal travels. The line 303 with diamonds as data points indicates phase offset (error) introduced by each BC clock individually. In the illustrated example, the individual PAO for each clock is within 100 ns of the received master clock which corresponds to 0 on the vertical axis.

The line 305 with squares as data points depicts the BC phase error as it accumulates with each BC, one after another, or NPAO (Node PAO). Since the errors of each BC are mostly negative, the accumulation increases generally in the negative direction. However, note that for example, node 9 has an NPAO of positive 100. As a result the accumulated PAO at node 9 is less negative than at node 8. Node 13, however, has an NPAO of about negative 100 so the accumulated result at node 13 is much more negative than at node 12. As shown, although each BC introduces a phase error of no more than 100 ns, the accumulated result through 20 hops can reach significantly higher.

The line 307 with triangles as data points shows the corrected result by distributing the SPAO (Sum PAO) or Esum as shown by the tilt back arrow between the 20 BC clocks. The change of each BC's error is small, as shown by the difference between line 305 and line 307. The line 309 with x's as data points is the accumulated result based on line 307 (the relation is the same comparing lines 303 and 305). Line 309 shows that while each BC makes only a small correction, the accumulated PAO for each BC is greatly improved. BC-18 changes from about 340 ns to about 100 ns.

Consider Emax or APAO (Absolute PAO) which denotes the total maximum of the time offset error of all BCs in the chain. Esum denotes the last BC time offset error from the OBC point of view. As long as Emax and Esum have the same sign, the overall result will be an improvement in clock accuracy.

Since Emax and Esum are accumulated PAO results, they are statistically coupled. From a statistical point of view, if all individual per BC PAOs (NPAOs) are randomly distributed, then the individual BC PAOs have a very high probability to have the same sign. The higher Emax is, the higher the Esum is likely to be and with the same sign as Emax. As a result, the whole BC chain becomes bad even if only one of the BCs has an error En that is too high. FIG. 3 provides a graphical illustration of a correction, that is done by "tilting" the trend line of the original error line with the detected offset at the end of the chain. The big arrow 301 is the tilting direction and amplitude and the resulting error curve is shown as the Accumulated Corrected PAO line 309.

As used herein, a network element (e.g., a router, switch, bridge) is a piece of networking equipment, including hardware and software, that communicatively interconnects with other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Figure 4:
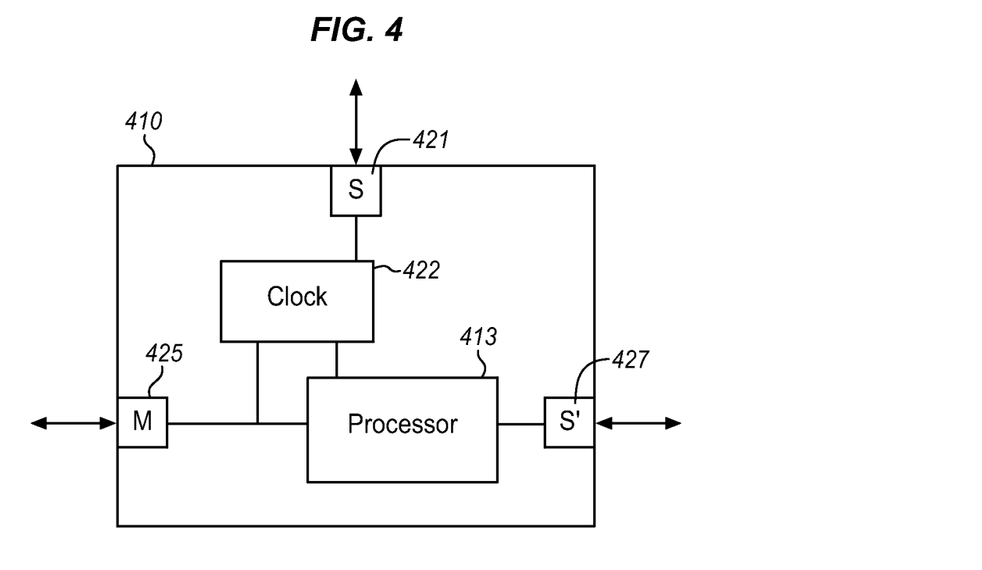
FIG. 4 is a diagram of one embodiment of a network element functioning as a master or slave clock node, such as a PTP BC, according to one embodiment of the invention.

FIG. 4 is a diagram of one embodiment of a network element functioning as a clock node, however, other network elements may have a similar configuration. Such a configuration may be used for any one of the BCs, including the master BC, root BC, or OBC, identified above as BC-0.

The network element includes a primary slave clock port 421 which is supplied to an internal clock 422 to synchronize traffic on ingress and egress. The internal clock 422 is synchronized to the master clock stream from the prior network element and received at the slave port input 421. The internal or local clock provides clocking to the processor 413 and to a master port output 425. The network element also features a secondary slave port 427 to receive return clocks from other network elements. The processor may compare the recovered time of day on the two slave ports to determine a PAO or error between the two connected clocks. If a correction or readjustment is to be sent, then it can be sent on an egress port or in another way (not shown).

PTP is typically implemented using Ethernet, or UDP/IP over Ethernet. In such an implementation, a single physical hardware port provides both master and slave clock functions as well as traffic egress and ingress functions. A PTP port, whether a master port or a slave port, can reside on a normal physical port, or a logical port, which may be a channel within the physical port.

As a result, the master port M can provide ingress and egress for regular traffic forwarding, as well as the PTP master port functions. The slave port S is similar. Of course, a network element may provide multiple input and output ports to suit particular implementations.

The network element 410 further includes ingress module functions and ingress module functions under the control of the network processor 413. These may be physically provided at the master and slave ports or at dedicated ports (not shown). The ingress module handles the processing of data packets being received by the network element at the physical link and data link level. The egress module handles the processing and data packets being transmitted by the network element at the physical link and data link level. The ingress and egress modules communicate with subscribers, edge routers, and other network elements through IPv4, IPv6, ATM or any of a variety of other formats and protocols.

The network processor 413 handles the routing, forwarding and higher level processing of the data traffic. It may include matching, lookup, classification, and routing tables for the processing of packets. It may also include memory to store the tables and instructions and software for routing, switching, clock synchronization and other functions.

Network elements are commonly separated into a control plane and a data plane (sometimes referred to as a forwarding plane or a media plane). The control plane programs the data plane with information (e.g., adjacency and route information) based on the routing structure(s). For example, the control plane programs the adjacency and route information into one or more forwarding structures and one or more adjacency structures on the data plane. The data plane uses these forwarding and adjacency structures when forwarding traffic.

Figure 5:
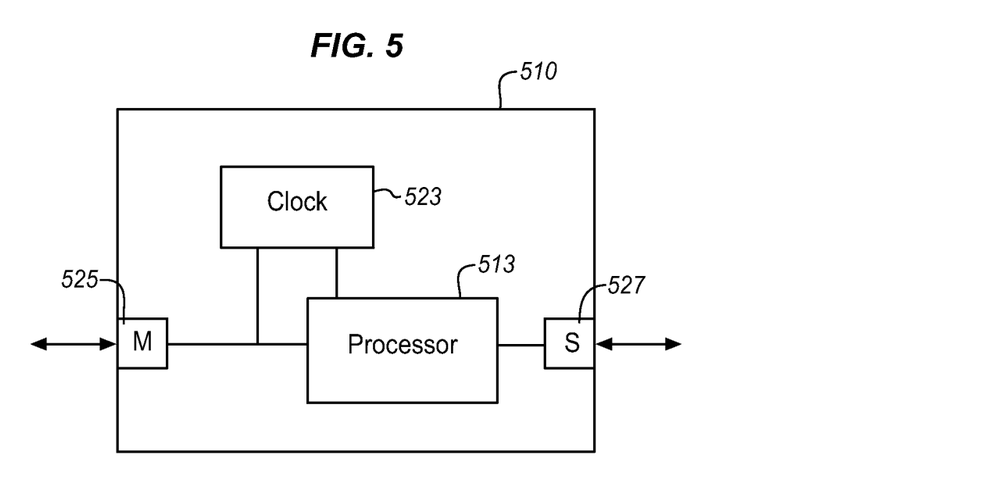
FIG. 5 is a diagram of another embodiment of a network element functioning as a slave clock node, such as a PTP BC, according to one embodiment of the invention.

FIG. 5 is a diagram of another embodiment of a network element functioning as a clock node, however, other network elements may have a similar configuration. Like the example 410 of FIG. 4, the network element 510 of FIG. 5 includes a network processor 513. The network processor 513 handles the routing, forwarding and higher level processing of the data traffic and applies any clock adjustment to its internal clock 523.

As in the example of FIG. 4, the network element also includes a slave port 527 which is supplied to an internal or local clock 523 to synchronize traffic on the ingress and egress modules. The internal clock 523 is synchronized to the slave clock input 527 and provides clocking to the processor 513 and a master clock port output 525. The network element does not have a secondary slave clock port and therefore does not perform the PAO correction determination described above, but can respond to corrections received from other nodes.

Figure 6:
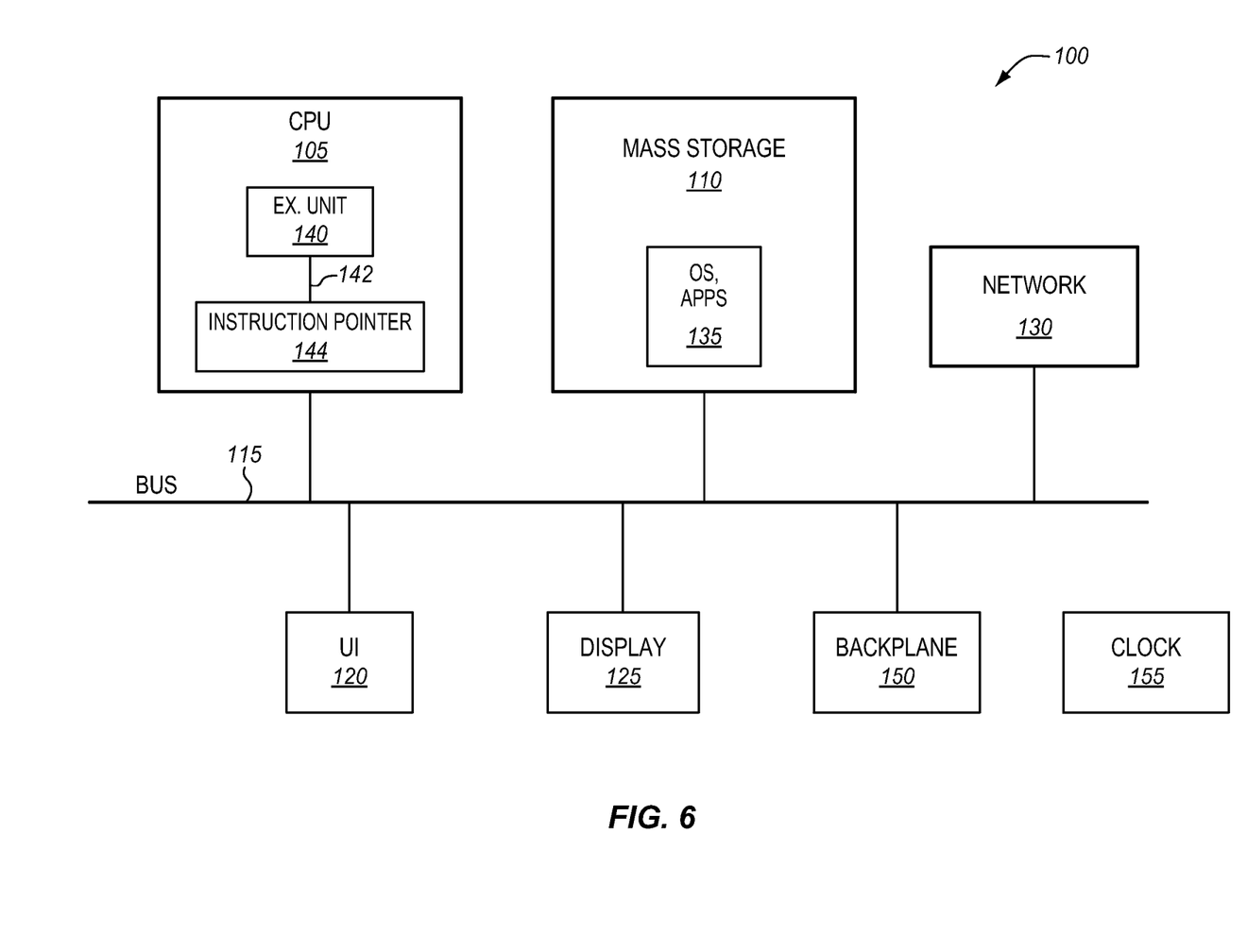
FIG. 6 is a block diagram illustrating an exemplary computer system suitable for use as a network processor according to one embodiment of the invention.

FIG. 6 shows a block diagram illustrating an exemplary computer system 100, suitable for use as a network processor or a network node or a clock controller according to one embodiment of the invention. The exemplary computer system 100 includes a processor 105 coupled to a storage device 110 by a bus 115. In addition, a number of user input/output devices, such as a keyboard 120 and a display 125, may also be coupled to the bus 115, but are optional parts. A network 130 interface may also be coupled to bus 115, for example through the chassis together with a backplane interface 150.

The processor 105 (single or multi core; and if multi core, symmetrical or asymmetrical cores) includes at least a central processing unit of any type of architecture, such as CISC, RISC, VLIW, or hybrid architecture. The processor 105 may also include a graphics processing unit (e.g., one or more cores), graphic bus interface(s), a memory management unit, and main memory bus interface(s). Furthermore, the processor 105 may be implemented on one or more die within the same chip. The storage device 110 and network traffic represents one or more machine-readable media. Thus, machine-readable media include any mechanism that provides (i.e., stores and/or transmits) information in a form readable by a machine (e.g., a computer). For example, a machine-readable medium may be machine-readable storage media (e.g., magnetic disks; optical disks; random access memory; read only memory; flash memory devices), machine-readable communication media (e.g., electrical, optical, acoustical or other form of propagated signals—such as carrier waves, infrared signals, digital signals, etc.); etc. The bus 115 represents one or more busses and bridges (also termed as bus controllers). While this embodiment is described in relation to a single processor computer system, other embodiments could include a multi-processor computer system.

The storage device 110 has stored therein operation system software and applications 135 for execution on the processor 105 to provide for correction of phase errors. The processor 105 also includes an execution unit 140, an internal bus 142, and an instruction pointer register 144. Of course, processor 110 contains additional circuitry, which is not necessary to understanding this description.

The internal bus 142 couples several of the elements of the processor 105 together as shown. The execution unit 140 is used for executing instructions. The instruction pointer register 144 is used for storing an address of an instruction currently being executed by the execution unit 140.

The term storage is used herein to refer to any mechanism for storing data, including locations in the mass storage device 110, one or more registers in the processor 105, etc. The processor 105 may be capable of executing new instructions and/or instructions similar to or the same as those found in existing general-purpose processors. Furthermore, in one embodiment, the processor 105 is a multi-core processor, with at least some of the cores being simultaneous multi-threaded (e.g., hyperthreaded), superscalar, pipelined, and capable of completing one or more of these instructions per clock cycle (ignoring any data dependencies and pipeline freezes).

A clock 155 which is synchronized through a slave port (not shown) and subject to phase alignment corrections, as described above, provides timing for any desired parts of the network element 100 through separate clock connections (not shown).

Figure 7:
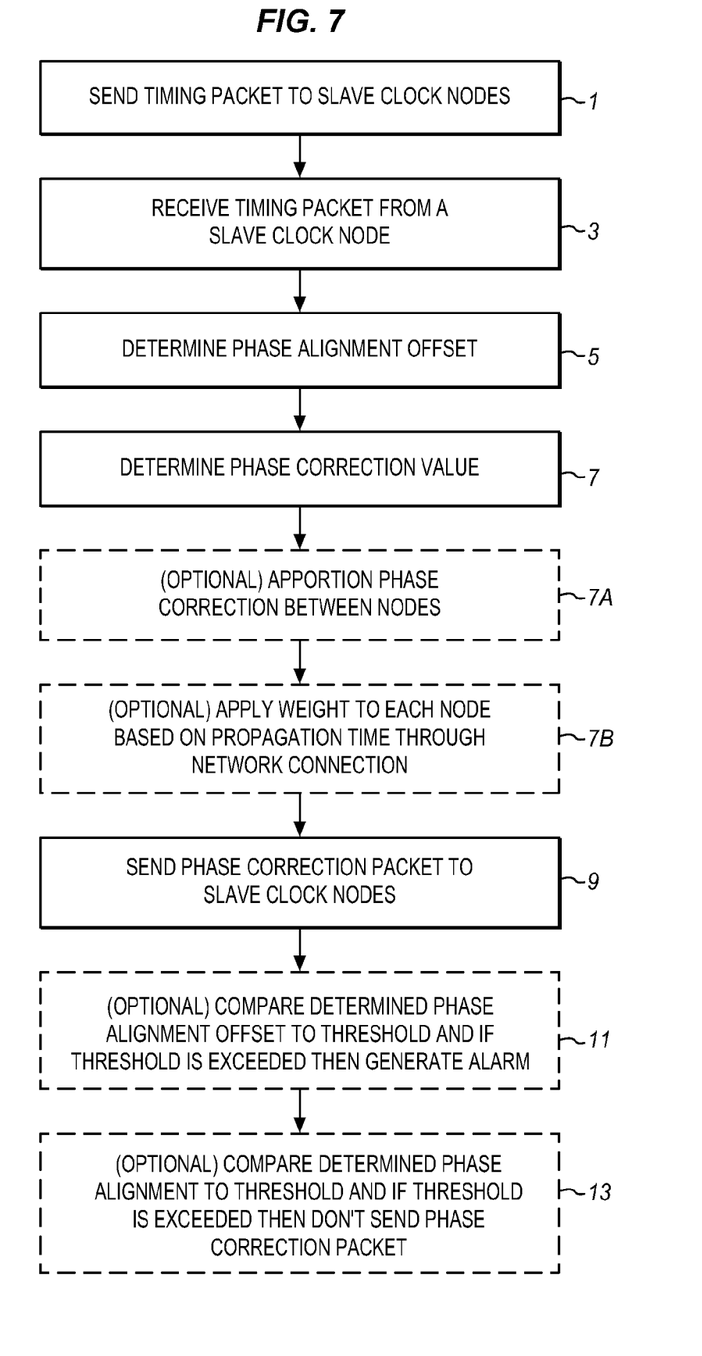
FIG. 7 is a process flow diagram of determining and correcting phase alignment errors in a master clock node according to one embodiment of the invention.

FIG. 7 is a process flow diagram for determining and correcting phase alignment errors in a network with a return loop. In the context of the process flow diagrams, a master clock node provides timing and phase correction to one or more slave clock nodes. These nodes are network nodes in a wired or wireless network. In the context of PTP, the master clock node and the slave clock nodes may all be BCs, as described above. The master clock node has a slave port and a master port for its local clock as do the slave clock nodes. The difference is that the clock of the master clock node is not controlled by a clock of any of the slave clock nodes while the clocks of the slave clock nodes are all directly or indirectly controlled by the master clock node. In the example of FIG. 1, the master clock node receives a GMOC stream at its slave clock node, however, the master clock node may be controlled by any external clock master or by its own clock. The network nodes also perform many other functions which are not described in detail herein.

At 1, a timing packet is sent to slave clock nodes. There may be one slave clock node or many depending upon the network topology. In the illustrated examples, the timing packet is sent to the neighboring slave clock node in the ring network topology. The timing packet is sent through a clock connection or a master port to a slave port to synchronize the local clock of the connected slave clock node. The slave clock node that receives the timing packet sets its clock and then generates a timing packet for the next slave clock node in the ring. This repeats until all of the slave clock nodes are set to the master timing of the timing packet. While this description concerns only one packet, typically ten or hundreds of packets are sent every second and the results from multiple packets are combined to determine errors and synchronization.

As mentioned above, the timing packet may include a time stamp such as time of day, or it may have some other configuration. The timing packet is sent from a master port to slave ports of the other nodes. The master timing may come from an internal or external clock source. The timing circulates though one or more slave nodes and then at 3, a timing packet is received from a master clock output port of one of the slave clock nodes in the network.

At 5, the received timing packet is compared to the original timing. In one embodiment, the recovered time of day of the received timing packet received from the slave port, S', is compared to the time of day of the local clock in the master clock node. In another embodiment a time stamp of the received timing packet is used. The difference is used to determine a phase alignment offset for the complete path of the packet from the master port of the master clock node from which the original time of day was distributed to the slave port of the master clock node at which a time of day is recovered.

In order to obtain more accurate or more consistent values, the master node may collect received timing packets over some time interval. Multiple packets and multiple comparisons may be combined as an average, a median, or in other ways to obtain a better estimate of the typical PAO over time. Alternatively, the multiple packets may be used to dynamically adjust the error over some repeating period. An example may be that the error is adjusted once every couple of seconds.

Using this difference, however it may be determined, the node at 7 determines a phase correction value. The phase correction value may be a simple apportionment of correction to each of the nodes or it may be a weighting so that some of the nodes correct their timing differently than others of the nodes.

As shown at 7A, the master timing node may optionally apportion the phase correction between nodes or optionally at 7B apply weights to each node based on propagation time through the network connection or on any other basis.

At 9, having determined a phase correction value for each of the nodes, that value is then sent to each of the slave clock nodes. The slave clock nodes can apply this correction to their own clocks to compensate for phase or timing alignment errors. The timing packet may go directly to each node, or through a daisy-chained ring of BCs to distribute independently addressed timing packets.

At 11, the master clock node may optionally generate an alarm. This may be done by first comparing the determined phase alignment offset from 5 to a threshold and if the threshold is exceeded then to generate the alarm. The alarm may be logged or sent to a system administrator or to some administration facility. At 13 the master clock node may also optionally compare the determined phase alignment to a threshold and, if the threshold is exceeded, then cancel the sending of a phase correction packet to the slave nodes. This may protect the network from attempting to make a phase correction when the alignment error is more than can be compensated for by a phase correction from the master clock node.

Figure 8:
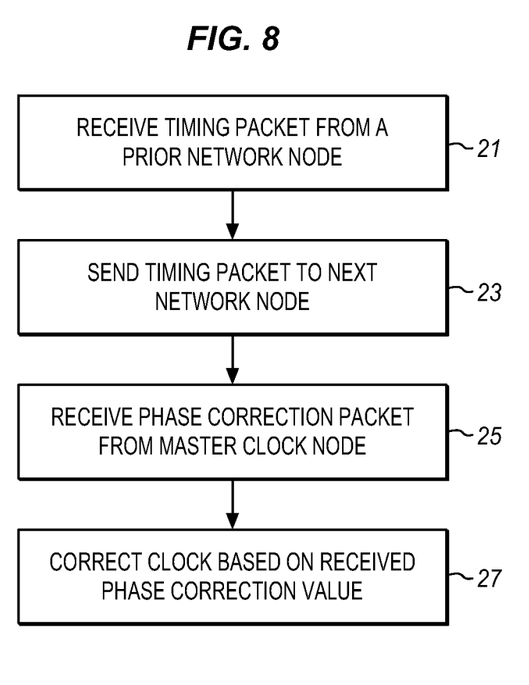
FIG. 8 is a process flow diagram of correcting phase alignment errors in a slave clock node according to one embodiment of the invention.

FIG. 8 is a process flow diagram for correcting a clock at a slave clock node that is coupled to a master clock node through a ring topology. At 21, the slave clock node receives a timing packet, such as a packet with a time stamp from a master port of another network node. If the slave clock node is connected to the master clock node, then the timing packet may come from the master clock node. If the slave clock node is connected to another slave clock node, then the timing packet will come from the slave clock node. In the ring topology, the timing packets progress through the ring starting at the master clock node, then through each slave clock node and back to the master clock node. As with FIG. 7, while only one packet is discussed, there may be tens or hundreds of packets every second.

The packet is received at a slave port of the slave clock node and may be used by the slave clock node to correct its own clock to synchronize with the upstream or prior network node in the ring.

At 23, the slave clock node sends generates a timing packet using its corrected local clock and sends the from its master port back to the slave port of the next network node in the ring, the downstream connected node. This is most likely another slave clock node, however, for the last slave clock node in the ring, the next network node will be the master clock node.

At 25, the slave clock node receives a phase correction packet that was generated by the master clock node. The packet may be received directly from the master clock node or it may be received from an adjacent network node. This phase correction packet includes a correction value for the slave clock node to apply. The correction value may be determined by the master clock node using an approach described above in the context of FIG. 7.

At 27, the slave clock node corrects its own clock based on the phase correction value that it received, directly or indirectly, from the master clock node.

While embodiments of the invention have been described in relation to PAO correction for PTP BCs, embodiments of the invention are not so limited. Similar techniques and equipment may be used to correct timing and phase alignment in other types of networks. The ring and tree structures may be simple or complex with more or fewer branches and more or fewer levels of nodes. The timing connections may be integrated with data connections or separate from data connections as suggested by the illustrated examples.

For example, while the flow diagrams in the figures show a particular order of operations performed by certain embodiments of the invention, it should be understood that the illustrated order is provided as an example. Alternative embodiments may perform the operations in a different order, combine certain operations, overlap certain operations, etc.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in a master clock node in a network of nodes having the master clock node with a local clock and a plurality of slave clock nodes each with a local clock, the slave clock nodes being in a ring topology from the master clock node and back to the master clock node, the method to synchronize the slave clock nodes of the network to the master clock node and to compensate for phase alignment offsets of the slave clock nodes, the method comprising:

creating a timing packet that includes within the timing packet a time stamp based on an obtained time;

sending the timing packet including the time stamp from a master port of the master clock node to a first slave clock node of the ring topology, each slave clock node having a slave port to receive a timing packet from one network node and a master port to transmit a timing packet to another network node;

receiving a timing packet from a last slave clock node of the ring topology at a slave port of the master clock node, wherein the last slave clock node is a different slave clock node than the first slave clock node;

determining a phase alignment offset of the slave clock nodes by comparing a recovered time from the received timing packet, which was received from the last slave clock node of the ring topology, with a time of the local clock of the master clock node;

determining a phase correction value for the slave clock nodes based on the determined phase alignment offset; and sending a phase correction packet including the phase correction value from the master clock node to the plurality of slave clock nodes.

2. The method of claim 1, wherein receiving the timing packet comprises receiving the timing packet at the slave port of the master clock node that is dedicated to phase alignment offset correction.

3. The method of claim 1, wherein determining the phase alignment offset comprises using a plurality of received timing packets and a plurality of responses to delay request packets in combination to determine the phase alignment offset.

4. The method of claim 1, wherein determining the phase alignment offset comprises comparing a phase of a recovered clock from the received timing packet with a phase of the local clock of the master clock node.

5. The method of claim 1, wherein determining the phase correction value comprises determining a number of the plurality of the slave clock nodes and dividing the determined phase alignment offset by the number of the slave clock nodes.

6. The method of claim 5, further comprising determining a weight for each of the slave clock nodes and adjusting the determined phase alignment offset for each slave clock node using the weight.

7. The method of claim 6, wherein the weight is determined using a propagation time from a master clock port of a previous slave clock node in the ring topology to a slave port of the slave clock node to which the weight is applied.

8. The method of claim 1, further comprising comparing the determined phase alignment offset to a threshold and if the threshold is exceeded then generating an alarm.

9. The method of claim 1, further comprising comparing a second determined phase alignment offset to a threshold and if the threshold is exceeded then not sending a second phase correction packet.

10. The method of claim 1, wherein the phase correction packet comprises a number of nanoseconds by which a clock of a slave clock node is adjusted.

11. The method of claim 10, wherein the phase correction packet includes an identification of a particular slave clock node to which the packet is addressed.

12. A method performed in a slave clock node in a network of nodes having a master clock node with a local clock and a plurality of slave clock nodes each with a local clock, the slave clock nodes being in a ring topology from the master clock node and back to the master clock node, the method to compensate for phase alignment offset among the slave clock nodes, the method comprising:

receiving a timing packet including a time stamp from a master port of a prior network node in the ring topology at a slave port of the slave clock node;

sending a timing packet that reflects the local clock of the slave clock node to a slave port of a next network node in the ring topology;

receiving a phase correction packet including a phase correction value generated by the master clock node, the phase correction value being based on a phase alignment offset determined by the master clock node using a timing packet received from a last slave clock node in the ring topology; and correcting the local clock of the slave clock node based on the phase correction value received in the phase correction packet.

13. The method of claim 12, wherein sending the timing packet comprises sending the timing packet to the slave port of the master clock node that is dedicated to phase alignment offset correction.

14. The method of claim 12, wherein the phase correction packet comprises a number of nanoseconds by which the local clock of the slave clock node is adjusted.

15. A master clock node in a network of nodes having the master clock node with a local clock and a plurality of slave clock nodes each with a local clock, the slave clock nodes being in a ring topology from the master clock node and back to the master clock node, the master clock node to compensate for phase alignment offset among the slave clock nodes, the master clock node comprising:

a local clock to maintain timing for the network;

a master port to send a timing packet including a time stamp to a slave port of a first one of the slave clock nodes in the ring topology;

a slave port to receive a timing packet from a last one of the slave clock nodes in the ring topology, wherein the last one of the slave clock nodes in the ring topology is a different slave clock node than the first one of the slave clock nodes in the ring topology; and a processor to determine a phase alignment offset of the slave clock nodes using the received timing packet, which is to be received from the last one of the slave clock nodes in the ring topology, and the sent timing packet, and to determine a phase correction value for the slave clock nodes based on the determined phase alignment offset;

the master clock node further to send a phase correction packet including the phase correction value from the master clock node to at least one of the plurality of slave clock nodes.

16. The master clock node of claim 15, further comprising a second slave port to receive a timing packet from a clock node external to the ring topology to set the local clock of the master clock node.

17. The master clock node of claim 15, wherein the processor determines the phase alignment offset using a plurality of received timing packets and a plurality of responses to delay request packets in combination.

18. The master clock node of claim 15, wherein the processor further compares the determined phase alignment offset to a threshold and if the threshold is exceeded then the processor generates an alarm.

19. A slave clock node in a network of nodes having a master clock node with a local clock and a plurality of slave clock nodes each with a local clock, the slave clock nodes being in a ring topology from the master clock node and back to the master clock node, the slave clock node to compensate for phase alignment offset among the slave clock nodes, the slave clock node comprising:

a local clock to maintain timing for the slave clock node;

a slave port to receive a timing packet including a time stamp from a master port of a prior network node in the ring topology, wherein the prior network node is not the master clock node;

a master port to send a timing packet to a slave port of a next network node in the ring, wherein the next network node in the ring is the master clock node; and a processor, the processor to correct the local clock based on a phase correction value received in a phase correction packet received from the master clock node, the phase correction value being based on a phase alignment offset determined at least in part based on the sent timing packet send to the master clock node.

20. The slave clock node of claim 19, wherein the phase correction packet comprises a number of nanoseconds by which a clock of the slave clock node is adjusted.

* * * * *